United States Patent Office  3,560,622
Patented Feb. 2, 1971

3,560,622
TRIFLUOROMETHYL OXAZEPINES, THIAZEPINES AND DIAZEPINES AS ANTI-INFLAMMATORY AGENTS
Francis Joseph McEvoy, Pearl River, N.Y., and George Rodger Allen, Jr., Old Tappan, N.J., assignors to American Cyanamid Company, Stamford, Conn., a corporation of Maine
No Drawing. Filed Oct. 13, 1967, Ser. No. 675,044
Int. Cl. A61k 27/00
U.S. Cl. 424—267                                   9 Claims

ABSTRACT OF THE DISCLOSURE

The preparation of 11-substituted 2-trifluoromethoxy-dibenz[b,f][1,4] oxazepines; 11 - substituted 2 - trifluoromethoxy-dibenz[b,f][1,4]thiazepines and 11-substituted 2-trifluoromethoxy dibenz [b,f][1,4] diazepines, by ring closure of suitable intermediates, is described. The novel compounds are useful as anti-depressants, anti-inflammatory and anti-pyretic agents.

SUMMARY OF THE INVENTION

This invention relates to novel trifluoromethoxy heterocyclic compounds of the formula:

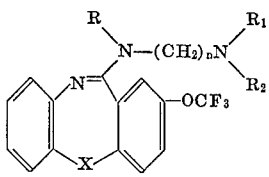

wherein R, $R_1$ and $R_2$ are selected from the group consisting of hydrogen and lower alkyl; the

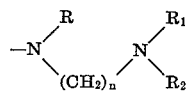

group taken together forms a member selected from the group consisting of 1 - piperazino, 4 - (lower alkyl)-1-piperazino, 4-piperidino and 1-(lower alkyl)-4-piperidino; X is oxygen, sulfur or >N-lower alkyl and n is an integer from 1 to 3.

The compounds of this invention are, in general, white crystalline solids only slightly soluble in water, but moderately soluble in organic solvents such as methanol, ethanol and the like. They are basic substances which are usually soluble in aqueous mineral acids at room temperature. They form substantially insoluble acid addition salts such as the hydrochloride, sulfate, phosphate, citrate, tartrate, maleate, fumarate, etc. The present compounds, generally in the form of their salts, may be administered orally or parenterally and when so administered are physiologically effective central nervous system agents, anti-inflammatory or anti-pyretic agents. The present compounds may be administered in from 0.3 mg. to 300 mg. per kilogram per day in warm-blooded animals. For oral administration the new compounds of this invention may be incorporated with the usual pharmaceutical excipients and used, for instance, in the form of tablets, capsules, dragées, liquids, to be administered in drops, emulsions, suspensions and syrups, and in chcocolate, candy, chewing gum and the like. They may also be administered in suppositories, and in aqueous solutions for parenteral injection.

The compounds of the present invention are preferably prepared as illustrated in the following flowsheet:

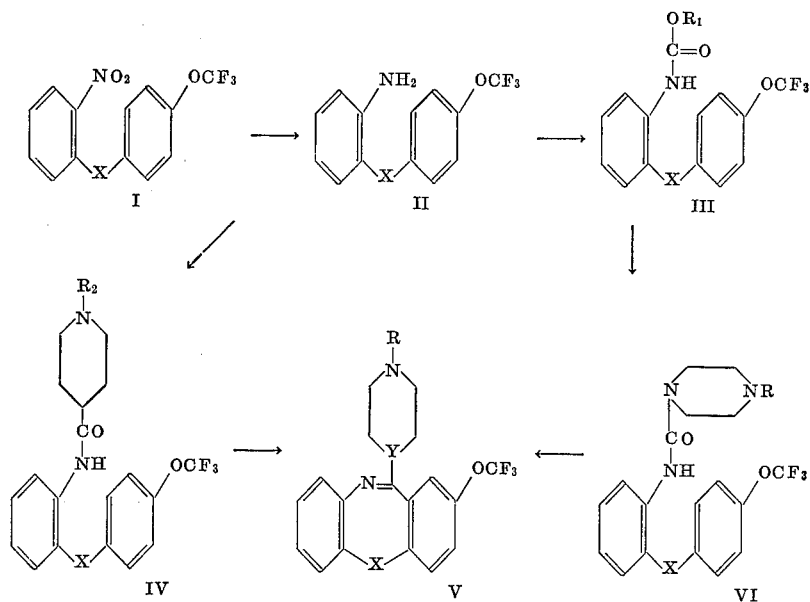

wherein R and X are as defined hereinbefore, $R_1$ is lower alkyl or phenyl, $R_2$ is lower alkyl or carbobenzyloxy and Y is nitrogen or methine. In accordance with this reaction scheme, a 4 - trifluoromethoxy - 2′ - nitrodiphenyl sulfide (X=S), oxide (X=O) or amine (N=N—lower alkyl) is reduced to the corresponding amino compound. This reduction may be accomplished by hydrogenation in the presence of a noble metal catalyst or by chemical reductants, e.g., iron and acetic acid, stannous chloride and hydrochloric acid, etc. Acylation of the resulting 2-amino - 4′ - trifluoromethoxydiphenyl sulfide, oxide, or amine (II) with a lower alkyl or aryl chloroformate furnishes the carbanilates (III). Alternatively, the amines (II) may be acylated with 1-alkylisonipecotoyl halides or 1-carbobenzyloxyisonipecotoyl halides to furnish the 1-substituted isonipecotanilides (IV). Reaction of the carbanilates (III) with piperazine, a 1-lower alkylpiperazine or a 1-hydroxylower alklypiperazine then furnishes the ureas (VI). Treatment of the 1-substituted disonipecotanilides (IV) or the ureas (VI) with a cyclodehydrating agent then furnishes the novel compounds (V) of the present invention. Suitable cyclodehydrating agents are polyphosphoric acid, phosphorous oxychloride, phosphorus pentoxide in conjunction with phosphorous oxychloride, and the like.

Certain of the compounds of the present invention may also be prepared as described in the following flowsheet.

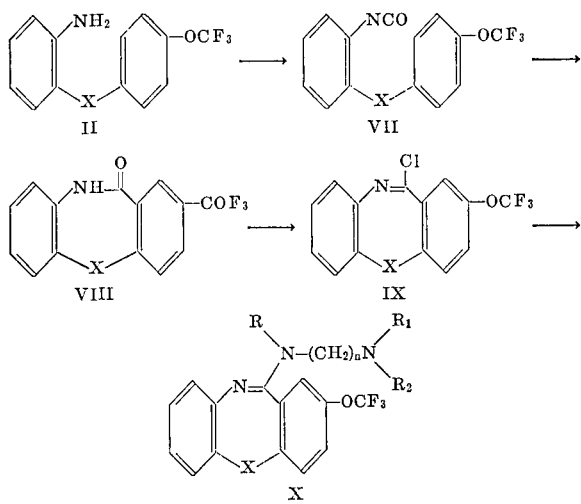

wherein R, $R_1$, $R_2$, $n$ and X are as defined hereinbefore. In accordance with this reaction scheme, treatment of the 2-amino - 4 - trifluoromethoxydiphenyl sulfide, oxide or amine with phosgene in an inert medium such as benzene, toluene, ethylene dichloride, o-dichlorobenzene and the like, furnishes the isocyanates (VII), which may be isolated or used without isolation. The isocyanates (VII) are converted into the lactams (VIII) by treatment with Lewis acids such as aluminum chloride, stannic chloride and the like, in an inert medium. Reaction of the lactams (VIII) prepared in this manner with a halogenating agent such as phosphorus oxychloride, phosphorus pentachloride or phosphorus pentachloride in conjunction with phosphorus oxychloride affords the 11-chloroazepine derivatives (IX). On treatment with piperazine, 1-lower alkylpiperazines, or 1-hydroxylower alkylpiperazines, the 11-chloroazepines (IX) are converted into the novel 11-substituted amino-2-trifluoromethoxyazepines of the present invention.

The compounds of the present invention are physiologically active on the central nervous system. They show high activity as tranquilizers at non-toxic doses and in some instances, anti-depressant properties at dosage levels which produce neither overt stimulation nor depression. A useful test for tranquilizer activity consists of measuring the reduction of spontaneous motor activity in animals by means of an actophotometer (a photoelectric device for quantitatively measuring locomotor activity). Graded doses of the active compounds prepared by the process of this invention are administered to groups of mice, and the effective dosage range for a significant reduction of motor activity (a measure of tranquilization) compared to control groups is established. The use of reduced motor activity as a measure of tranquilizing activity has been described by W. D. Gray, A. C. Osterberg and C. E. Rauh, Archives Internationales et de Therapie, vol. 134, p. 198 (1961) and W. J. Kinnard and C. J. Carr, Journal of Pharmacology and Experimental Therapeutics, vol. 121, p. 354 (1957).

The anti-depressant properties of the compounds of the present invention are determined by measuring their ability to counteract a depression induced in animals by the administration of tetrabenazine hexamate. Graded doese of the active compounds of this invention are administered to groups of mice, and this is followed by administering a dose of the tetrabenazine which is known to markedly depress the exploratory behavior of normal mice. The anti-depressant treated groups show normal exploratory behavior, while the control groups, and groups treated with an ineffective anti-depressant agent, do not show this normal exploratory behavior, but show well known profound depression induced by tetrabenazine. The results from several dose levels are used to establish effective dose ranges. The anti-depressant compounds prepared by the process of this invention show their desirable properties by this procedure at dose levels which produce little or no untoward reactions, such as ataxia or reduced spontaneous motor activity. In addition, some of the compounds of this invention show other valuable pharmaceutical properties, such as anti-inflammatory and anti-pyretic activity. A test useful in detecting anti-inflammatory activity is a modification of the method reported by C. A. Winter et al., Proc. Soc. Exptl. Biol. Med., 111, 544 (1962). This test involves the reduction of the edema caused by the injection of a 2% carrageenin solution. Briefly, the test is as follows: Groups of two rats each are injected subcutaneously at the midline of the shaved sacral region with 0.5 ml. of an aqueous 2% carrageenin solution. Carrageenin is a polygalactose sulfate extracted from Irish moss, a type of seaweed. Subcutaneous injection of carrageenin causes rapid formation of an intense subcutaneous inflammatory reaction which develops into a connective tissue granuloma. The test compounds of this invention are suspended in aqueous 1% starch-sodium phosphate buffer solution, pH 6.5, and administered by oral tubing in 0.5 ml. of said buffer; the total dose for each animal is 250 mg./kg. of body weight. One-half of each total dose is administered immediately following the carrageenin injection and the other half of each total dose is administered all at once immediately following the carrageenin injection. The animals are sacrificed 24 hours after the carrageenin injection. The inflammatory reaction to the carrageenin initiates the formation of exudate and gelatinous material which is removed and weighed. Control animals receive the carrageenin injection and the starch-sodium phosphate buffer solution orally without the test compound. Critical ratios, i.e., the weight of exudate and gelatinous material from control animals to the weight of some from test animals $(C/T)$ are calculated. The ratios are then compared by a 3-stage sequential screening procedure representing a statistically designed method for detecting anti-inflammatory activity which is significantly different than the variability of control animals at the 95% confidence level.

| Stage | C/T ratio | |
|---|---|---|
| | Reject | Accept |
| (1) $(C/T)_1$ | 1.11 or below | 1.65 or above. |
| (2) $(C/T)_1 \times (C/T)_2$ | 1.49 or below | 2.23 or above. |
| (3) $(C/T)_1 \times (C/T)_2 \times (C/T)_3$ | Below 2.46 | 2.46 or above. |

Thus, a compound which on the first stage gives a $(C/T)_1 = 1.11$ or below is rejected; if the ratio is between 1.11 and 1.65 the compound is retested; and if the ratio is 1.65 or above the compound is accepted as active. On the second stage (retest because $(C/T)_1$ is between 1.11 and 1.65) if the product $(C/T)_1 \times (C/T)_2$ is 1.49 or below the compound is rejected; if the product is between 1.49 and 2.23, the compound is retested; and if the product is 2.23 or above, the compound is accepted as active. On the third stage, if the product $$(C/T)_1 \times (C/T)_2 \times (C/T)_3$$

is less than 2.46, the compound is accepted as an active anti-inflammatory agent.

A useful assay for detecting anti-pyretic activity consists of administering to 60 gm. rats 0.6 ml. of a 40% brewer's yeast solution the test compound is administered orally. Two hours later, the rectal temperature of the test animals is measured using an electronic thermometer. The temperature suppression-effect of the test compound is expressed as the difference $(C-T)$ in temperature between the control and treated groups.

DETAILED DESCRIPTION

The following examples describe in greater detail the novel substituted dibenz[b,f][1,4]oxazepines, dibenz[b,f][1,4]thiazepines and dibenz[b,f][1,4]diazepines of the present invention.

EXAMPLE 1

Preparation of 11-(4-methyl-1-piperazinyl)-2-trifluoromethoxydibenz[b,f][1,4]oxazepines A suspension of 29.8 g. of p-trifluoromethoxyaniline sulfate in 30 ml. of water and 33 ml. of 98% sulfuric is cooled to 0° C. with vigorous stirring. A solution of 7.6 g. of sodium nitrite in 75 ml. of water is added dropwise over 15 minutes. The resulting mixture is stirred at 0° C. for an additional 40 minutes, when solution is essentially completed. The residual solid is removed by filtration, and the filtrate is heated on the steam bath for 2.5 hours when gas evolution is completed. The cooled solution is extracted with three 150 ml. portions of ether, and the combined extracts are washed with saline, dried over magnesium sulfate and evaporated to furnish an oil that is subjected to steam distillation. The distillate is extracted with ether to furnish p-trifluoromethoxyphenol as a yellow oil.

A solution of 11.6 g. of p-trifluoromethoxyphenol, prepared as described above, in 200 ml. of ether is treated over 15 minutes with a molar equivalent of a sodium hydride in mineral oil dispersion. When the gas evolution subsides, the mixture is heated under reflux for 10 minutes and then evaporated. The resulting sodium p-trifluoromethoxyphenolate is dissolved in 100 ml. of dimethylformamide and added to 10.3 g. of 1-chloro-2-nitrobenzene in 100 ml. of dimethylformamide. The resulting solution is stirred at reflux temperature for 90 minutes, cooled and filtered. The filtrate is evaporated, and the residue is partitioned between ether and water. The ethereal solution is washed with a sodium hydroxide solution, saline and then dried and evaporated to give 2-nitro-4'-trifluoromethoxydiphenyl ether as a yellow oil.

The above 2-nitro-4'-trifluoromethoxydiphenyl ether is dissolved in 200 ml. of ethanol, and shaken under hydrogen in the presence of 16 g. of wet Raney nickel catalyst until the hydrogen uptake ceases. Filtration and removal of the solvent furnishes 2-(p-trifluoromethoxyphenoxy)-aniline as a gum.

A solution of the above 2-(p-trifluoromethoxyphenoxy)-aniline in 150 ml. of pyridine is cooled in an ice bath and with stirring 8.0 ml. of phenyl chloroformate is added dropwise. The mixture is maintained at imbient temperature with stirring for 18 hours and then partitioned between ethyl acetate and water. The organic phase is washed successively with 10% hydrochloric acid, water, 10% sodium carbonate solution and water, dried, and evaporated to furnish phenyl 2-(p-trifluoroethoxyphenoxy)carbanilate as a gum. To a solution of phenyl 2-(p-trifluoromethoxyphenoxy)carbanilate, prepared as described above, in 150 ml. of benzene is added 23 ml. of 1-methylpiperazine. The solution is boiled in an open flask for 70 minutes and then evaporated. The residue is distributed between ether and a 1 N hydrochloric acid solution. The acid solution is rendered alkaline with 10% sodium hydroxide and extracted with ether. Evaporation of the ethereal extract gives a solid that is recrystallized from acetone-water to furnish 4-methyl-2'-(p-trifluoromethoxy)-1-piperazinecarboxanilide as white crystals, melting point 98–100° C. On treatment with ethereal hydrogen chloride this substance gives a hydrochloride salt as white crystals, melting point 214–216° C.

A mixture of 2.5 g. of 4-methyl-2'-(p-trifluoromethoxyphenyl)-1-piperazinecarboxanilide hydrochloride, prepared as described above, and 2.5 g. of phosphorus pentoxide in 25 ml. of phosphorus oxychloride is stirred at reflux temperature for 24 hours. The solution is evaporated and the residual glass is treated with water until the vigorous reaction subsides. 6 N hydrochloric acid is added, and the mixture is filtered to remove some undissolved solid. The filtrate is partially neutralized with a 10% sodium hydroxide solution and then rendered alkaline with sodium bicarbonate solution. The resultant mixture is extracted with ether, and the ethereal solution is dried and evaporated. The resulting residue is dissolved in methylene chloride and chromatographed on a synthetic magnesia-silica gel absorbent. After elution of the column with methylene chloride, elution with acetone-in-methylene chloride (3:97 to 5:95) furnishes, after solvent removal, 11-(4-methyl-1-piperazinyl) - 2 - trifluoromethoxydibenz-[b,f][1,4]oxazepine as a gum. On treatment with ethereal hydrogen chloride this substance gives a dihydrochloride hydrate as white crystals, melting point 200–210° C. The compound when tested by the procedure described hereinbefore shows Ataxia @ 4 mg./kg. Motor depressant activity @ 1.4 mg./kg.

EXAMPLE 2

Preparation of 5-methyl-11-(4-methyl-1-piperazinyl)-2-trifluoromethoxy-5H-dibenz[b,f][1,4]diazepine A suspension of 10.0 g. of p-trifluoromethoxyaniline sulfate in 120 ml. of 10% sodium hydroxide solution is heated on the steam bath until solution is complete. The solution is cooled in an ice-bath and 6.4 ml. of benzoyl chloride is added portionwise with shaking. The solid is collected, washed with water and recrystallized from acetone-benzene to give 4-trifluoromethoxybenzanilide as crystals, melting point 185–187° C.

A suspension of 10.38 g. of 4-trifluoromethoxybenzanilide in 185 ml. of benzene is treated with 7.7 g. of phosphorus pentachloride, and the solution is heated at reflux for 1 hour, after which, the solvent is removed. The residue is dissolved in 75 ml. of ether, and this solution is added dropwise to a cold methanol solution of sodium o-nitrophenoxide (prepared from 2.0 g. of sodium methoxide and 5.15 of o-nitrophenol). The mixture is stirred at ambient temperature for 3 hours and then diluted with water. The product is isolated with ther and trituration with hexane gives o-nitrophenyl N-(4-trifluoromethoxyphenyl)benzimidate as white needles, melting point 80–82° C.

A solution of 13.1 g. of o-nitrophenyl-N-(4-trifluoromethoxy)benzimidate in 130 ml. of o-dichlorobenzen is heated under reflux for approximately 2 hours, and then subjected to steam distillation to remove the solvent. The product is recovered from the pot residue with methylene chloride and recrystallized from acetone-hexane to furnish α,α,α-trifluoro-N-(o-nitrophenyl)-p-benzanisidine as yellow needles, melting point 122–123° C.

A mixture of 7.60 g. of α,α,α-trifluoro-N-(o-nitrophenyl)-p-benzanisidine, prepared as described above, in 46 ml. of ethanol and 24 ml. of 10% sodium hydroxide solution is heated under reflux for 1 hour and diluted with water to furnish α,α,α-trifluoro-N-(o-nitrophenyl)-p-anisidine as orange crystals, melting point 68–70° C.

A solution of 5.6 g. of α,α,α-trifluoro-N-(o-nitrophenyl)-p-anisidine, prepared as described above, in 58 ml. of acetone is treated with 5.8 g. of powdered potassium hydroxide and 1.8 ml. of methyl sulfate and swirled for 5 minutes. Additional methyl sulfate (4 ml.) is added and the mixture is boiled for 5 minutes and then filtered with water. The product is isolated with methylene chloride, and evaporation of the solvent furnishes α,α,α-trifluoro-N-methyl-N-(o-nitrophenyl)-p-nitrophenyl) - p - anisidine as an oil, which on catalytic hydrogenation in ethanol with a Raney nickel catalyst furnishes α,α,α-trifluoro-N-methyl-N-(o-aminophenyl)-p-anisidine.

To a solution of 5.0 g. of α,α,α-trifluoro-N-methyl-N-(o-aminophenyl)-p-anisidine, prepared as described above, in 50 ml. of dry pyridine is added dropwise 2.42 ml. of phenyl chloroformate. The mixture is stirred at ambient temperature for 18 hours, and then diluted with water. The mixture is extracted with ethyl acetate, and the extracts are washed successively with water, a 10% hydrochloric acid solution, water, a 10% sodium carbonate solution, and water. Removal of the solvent furnishes phenyl o-(α,α,α-trifluoro-N-methyl-p-anisidino)carbanilate as an amber gum.

A solution of 8 ml. of 1-methylpiperazine and 7.9 g. of phenyl o-(α,α,α-trifluoro-N-methyl-p-anisidino)carbanilate in 120 ml. of benzene is heated on the steam bath for 30 minutes, allowing the solvent to evaporate. The residue is heated at 110° C. for 1 hour and then dissolved in ether. Addition of 1 N hydrochloric acid solution furnishes 4-methyl - 2' - (α,α,α-trifluoro-N-methyl-p-anisidino) - 1 - piperazinecarboxanilide hydrochloride as white crystals, melting point 235–238° C.

A mixture of 300 mg. of 4-methyl-2'-(α,α,α-trifluoro-N-methyl-p-anisidino) - 1 - piperazinecarboxanilide hydrochloride, prepared as described above, and 285 mg. of phosphorus pentoxide in 3 ml. of phosphorus oxychloride is heated under reflux for 3.5 hours. The mixture is cooled and water is cautioulsy added until the vigorous reaction subsides; an additional 25 ml. of water is added, and the resulting mixture is filtered. The filtrate is cooled in an ice-bath and rendered alkaline with ammonium hydroxide. The solid that separates is recrystallized from acetone-water to furnish 5-methyl-11-(4-methyl-1-piperazinyl) - 2 - trifluoromethoxy - 5H - dibenz[b,f][1,4]diazepine as yellow crystals, melting point 146–148° C. This compound when tested in the carrigeenin assay described hereinbefore at a dose of 250 mg./kg. gives $C/T$ ratios of 2.21 and 3.00. In the anti-pyretic assay a dose of 250 mg./kg. gives $(C-T)$ values of 2.15 and 1.83.

EXAMPLE 3

Preparation of 11-(4-methyl-1-piperazinyl)-2-trifluoromethoxydibenz[b,f][1,4]thiazepine To a solution of 0.1 mole of p-trifluoromethoxyphenol, prepared as described in Example 1, in dimethylformamide is added, in small portions, a molar equivalent of sodium hydride. After the evolution of hydrogen ceases, the solution is cooled in an ice-bath and 0.12 mole of dimethylthiocarbamoyl chloride is added. The cooling bath is removed, and the mixture is heated on the steam bath for 1 hour. The cooled solution is poured onto 1% sodium hydroxide solution, and this solution is saturated with sodium chloride and extracted with benzene. Removal of the solvent gives o-p-trifluoromethoxyphenyl dimethylthiocarbamate which is heated at 180–225° C. to furnish S-p-trifluoromethoxyphenyl dimethylthiocarbamate. This last substance is heated with methanolic sodium hydroxide under nitrogen; acidification of the cooled solution and extraction with benzene furnishes p-trifluoromethoxythiophenol.

A solution of p-trifluoromethoxythiophenol, prepared as described above, in ethanol is heated at reflux temperature with a solution of 1.1 molar equivalent of sodium hydroxide in water and 1.1 molar equivalent of 1-chloro-2 - nitrobenzene to give 4 - trifluoromethoxy - 2' - nitrodiphenyl sulfide.

A solution of 4-trifluoromethoxy - 2' - nitrodiphenyl sulfide, prepared as described above, in ether, is added to stannous chloride dihydrate. With mechanical stirring a 37% hydrochloric acid solution is added to this mixture at such a rate that gentle reflux is maintained. The resulting mixture is stirred for 16 hours and filtered to furnish 2-amino - 4' - trifluoromethoxydiphenyl sulfide hydrochloride. This salt is distributed between ether and alkali. Removal of the solvent from the organic solution furnishes 2-amino-4'-trifluoromethoxydiphenyl sulfide.

A solution of the above 2-amino-4'-trifluoromethoxydiphenylsulfide in pyridine is cooled in an ice-bath and treated with phenyl chloroformate. The product, phenyl 2 - (p-trifluoromethoxyphenylthio)carbanilate, is isolated by distribution of the reaction solution between ethyl acetate and water and removal of the solvent from the organic solution.

By the procedures described in Example 1, treatment of phenyl 2 - (p-trifluoromethoxyphenylthio)carbanilate, prepared as described above, with 1 - methylpiperazine furnishes 4 - methyl - 2' - (p-trifluoromethoxyphenylthio) - 1 - piperazinecarboxanilide which gives the hydrochloride salt on treatment with ethereal hydrogen chloride.

In the manner described in Example 1, treatment of 4 - methyl - 2' - (p-trifluoromethoxyphenylthio)-1-piperazine-carboxanilide hydrochloride, prepared as described above, with phosphorus pentoxide in phosphorus oxychloride furnishes 11 - (4 - methyl - 1 - piperazinyl)-2-trifluoromethoxydibenz[b,f][1,4]thiazepine.

EXAMPLE 4

Preparation of 11-(1-piperazinyl)-2-trifluoromethoxydibenz[b,f][1,4]oxazepine

A solution of 2-(p-trifluoromethoxyphenoxy)aniline in o-dichlorobenzene is added at ice bath temperature to a saturated solution of phosgene in o-dichlorobenzene. The resulting mixture is heated at 90–110° C. until a clear solution results. Nitrogen gas is then introduced to remove the excess phosgene giving a solution of 2-(p-trifluoromethoxyphenoxy)phenyl isocyanate.

The above solution of 2-(p-trifluoromethoxy)phenyl isocyanate in o-dichlorobenzene is treated with anhydrous aluminum chloride at 110–150° for one hour. Cracked ice is added, and the mixture is steam-distilled to remove o-dichlorobenzene. The 2-trifluoromethoxy-10, 11-dihydro-11-oxodibenz[b,f][1,4]oxazepine, thus formed, is isolated from the residual mixture.

The 2-trifluoromethoxy-10,11-dihydro-11 - oxodibenz-[b,f][1,4]oxazepine, prepared as described above, is treated with phosphorous oxychloride at reflux temperature. The excess phosphorus oxychloride is removed under reduced pressure. The resulting 11-chloro-2-trifluoromethoxydibenz[b,f][1,4]oxazepine is dissolved xylene, treated with piperazine at reflux temperature, and the resulting solution is cooled and extracted with dilute hydrochloride acid. The acid extract is rendered alkaline with ammonium hydroxide to give 11-(1-piperazinyl)-2-trifluoromethoxydibenz[b,f][1,4]oxazepine.

EXAMPLE 5

Preparation of 11-(1-piperazinyl)-2-trifluoromethoxydibenz[b,f][1,4]thiazepine

By the procedures of Example 4, 2-amino-4'-trifluoromethoxydiphenyl sulfide, prepared as described in Example 3, is treated with phosgene to furnish 2-(p-trifluoromethoxyphenylthio)phenyl isocyanate. Reaction of this isocyanate with aluminum chloride in o-dichlorobenzene furnishes 2-trifluoromethoxy-10,11-dihydro-11-oxodibenz-[b,f][1,4]thiazepine. This substance is then converted into 11-chloro - 2 - trifluoromethoxidibenz[b,f][1,4]thiazepine, which on treatment with piperazine furnishes 11-(1-piperazinyl)-2 - trifluoromethoxydibenz [b,f,][1,4]thiazepine.

EXAMPLE 6

Preparation of 11-(1-methyl-1-4-piperidyl)-2-trifluoromethoxydibenz[b,f][1,4]oxazepine A solution of 2 - (p - trifluoromethoxyphenoxy)aniline, prepared as described in Example 1, in pyridine is treated with 1-methylisonipecotoyl chloride hydrochloride to furnish 2 ' -(p-trifluoromethoxyphenoxy) - 1 - methyl-isonipecotanilide.

In the manner described in Example 1, treatment of the above 2'-(p-trifluoromethoxyphenoxy)-1-methyliso-nipecotanilide with phosphorus pentoxide in phosphorus oxychloride furnishes 11 - (1 - methyl-4-piperidyl)-2-trifluoromethoxydibenz[b,f][1,4]-oxazepine.

EXAMPLE 7

Preparation of 11-(4-piperidyl)-2-trifluoromethoxy-
dibenz[b,f][1,4]oxazepine

A solution of 2-(p-trifluoromethoxyphenoxy)aniline, prepared as described in Example 1, in pyridine is treated with 1-carbobenzyloxyisonipecotoyl chloride to furnish 2' - (p - trifluoromethoxyphenoxy) - 1 - carbobenzyloxy-isonipecotanilide.

By the procedure of Example 1, treatment of the above 2' - trifluoromethoxyphenoxy) - 1 - carbobenzyloxyisoni-pecotanilide with phosphorus pentoxide in phosphorus oxychloride furnishes 11 - (4 - piperidyl) - 2 - trifluoro-methoxydibenz[b,f][1,4]oxazepine.

EXAMPLE 8

Preparation of 11-[4-(2-hydroxyethyl)-1-piperazinyl]-2-
trifluoromethoxydibenz[b,f][1,4]oxazepine By the procedure of Example 4, treatment of 11-chloro-2-trifluoromethoxydibenz[b,f][1,4]oxazepine with 1 - (2-hydroxyethyl)piperazino furnishes 11 - [4 - (2 - hydroxyethyl) - 1 - piperazinyl] - 2 - trifluoromethoxydibenz[b,f][1,4]oxazepine.

EXAMPLE 9

Preparation of 11-(2-aminoethylamino)-2-trifluoro-
methoxy[b,f][1,4]oxazepine

Using the process of Example 4, treatment of 11-chloro - 2 - trifluoromethoxydibenz[b,f][1,4]oxazepine with ethylenediamine gives 11 - (2-aminoethylamino)-2-trifluoromethoxydibenz[b,d][1,4]oxazepine.

EXAMPLE 10

Preparation of 11-(2-dimethylaminoethylamino)-2-
trifluoromethoxy[b,f][1,4]oxazepine Using the procedure of Example 4, treatment of 11-chloro-2-trifluoromethoxydibenz[b,f][1,4]oxazepine with 2-dimethylaminoethyl amine gives 1-(2-dimethylamino-ethylamino) - 2 - trifluoromethoxydibenz[b,f][1,4]oxazepine.

EXAMPLE 11

Preparation of 11-(3-dimethylaminopropylamino)-2-
trifluoromethoxy[b,f][1,4]oxazepine When the procedure of Example 4 is used and 11-chloro - 2 - trifluoromethoxydibenz[b,f][1,4]oxazepine is treated with 3-dimethylaminopropylamine the product 11-(3 - dimethylaminopropylamino) - 2 - trifluoromethoxy-dibenz[b,f][1,4]oxazepine is obtained.

EXAMPLE 12

Preparation of 11-[methyl(2-methylaminoethyl)amino]-
2-trifluoromethoxy[b,f][1,4]oxazepine Using the procedure of Example 4, and reacting 11 chloro-2-trifluoromethoxydibenz[b,f][1,4]oxazepine with N,N' - dimethylethylenediamine produces 11 - [methyl(2-methylaminoethyl)-amino] - 2 - trifluoromethoxydibenz-[b,f][1,4]oxazepine.

EXAMPLE 13

Preparation of 11-[methyl(2-dimethylaminoethyl)
amino]-2-trifluoromethoxy[b,f][1,4]oxazepine When the procedure of Example 4 is used and 11-chloro - 2 - trifluoromethoxydibenz[b,f][1,4]oxazepine is treated with N,N,N'-trimethylethylenediamine the product 11 - [methyl(2 - dimethylaminoethyl)amino] - 2 - trifluoromethoxydibenz[b,f][1,4]-oxazepine is obtained.

What is claimed is:

1. A method for lowering inflammation in warm-blooded animals which comprises administering to an animal in need of such treatment an anti-inflammatory effective amount of a trifluoromethoxydibenz compound of the formula:

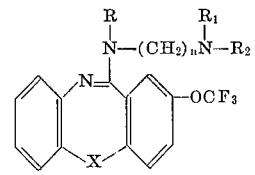

wherein R, $R_1$, and $R_2$ are selected from the group consisting of hydrogen and lower alkyl; the

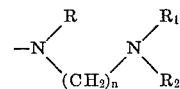

group taken together forms a member selected from the group consisting of 1-piperazino, 4-(loweralkyl)-1-piperazino, 4-piperidino and 1-(loweralkyl)-4-piperidino; X is selected from the group consisting of oxygen, sulfur and >N-lower alkyl and $n$ is an integer from 1 to 3.

2. The trifluoromethoxydibenz compound according to claim 1: 11-(4-methyl-1-piperazinyl)-2-trifluoromethoxy-dibenz[b,f][1,4]oxazepines.

3. The trifluoromethoxydibenz compound according to claim 1: 5 - methyl-1-(4-methyl-piperazinyl)-2-trifluoromethoxy-5H-dibenz[b,f][1,4]diazepine.

4. The trifluoromethoxydibenz compound according to claim 1: 11 - (4-methyl-1-piperazinyl)-2-trifluoromethoxy-dibenz[b,f][1,4]thiazepine.

5. The trifluoromethoxydibenz compound according to claim 1: 11 - (1 - piperazinyl) - 2-trifluoromethoxydibenz-[b,f][1,4]oxazepine.

6. The trifluoromethoxydibenz compound according to claim 1: 11 - (1 - piperazinyl) - 2-trifluoromethoxydibenz-[b,f][1,4]thiazepine.

7. The trifluoromethoxydibenz compound according to claim 1: 11 - (1 - methyl-4-piperidyl)-2-trifluoromethoxy-dibenz[b,f][1,4]oxazepine.

8. The trifluoromethoxydibenz compound according to claim 1: 11 - (4 - piperidyl) - 2 - trifluoromethoxydibenz-[b,f][1,4]oxazepine.

9. The trifluoromethoxydibenz compound according to claim 1: 11 - [4 - (2 - hydroxyethyl)-1-piperazinyl]-2-trifluoromethoxydibenz[b,f][1,4]oxazepine.

References Cited

UNITED STATES PATENTS 3,444,169  5/1969  Howell et al. _____ 260—268

JEROME D. GOLDBERG, Primary Examiner

U.S. Cl. X.R.

424—244